United States Patent
Lee

(10) Patent No.: US 7,541,856 B2
(45) Date of Patent: Jun. 2, 2009

(54) BASELINE WANDERING CORRECTION DEVICE AND RELATED METHOD

(75) Inventor: Wen-Jan Lee, Hsinchu (TW)

(73) Assignee: Princeton Technology Corporation, Taipei County (TW)

( * ) Notice: Subject to any disclaimer, the term of this patent is extended or adjusted under 35 U.S.C. 154(b) by 32 days.

(21) Appl. No.: 11/889,151

(22) Filed: Aug. 9, 2007

(65) Prior Publication Data

US 2008/0191775 A1 Aug. 14, 2008

(30) Foreign Application Priority Data

Feb. 14, 2007 (TW) .............................. 96105452 A

(51) Int. Cl.
*H03L 5/00* (2006.01)
(52) U.S. Cl. ..................... 327/307; 327/73; 327/74; 327/76
(58) Field of Classification Search ................. 327/307
See application file for complete search history.

(56) References Cited

U.S. PATENT DOCUMENTS 5,182,476 A * 1/1993 Hanna et al. ................ 327/306
5,373,400 A * 12/1994 Kovacs ........................ 327/74
5,736,875 A * 4/1998 Sakamoto et al. ............. 327/74

* cited by examiner

*Primary Examiner*—Long Nguyen
(74) *Attorney, Agent, or Firm*—Muncy, Geissler, Olds & Lowe, PLLC

(57) ABSTRACT

The invention discloses baseline wandering correction techniques. A baseline wandering correction device comprises a differentiator differentiating a data signal to generate a differentiated signal, a operation signal coupling to the differentiator and proceeding with an operation based on the data signal according to the differentiated signal to generate an operated signal, an extracting module coupling to the operation module and determining a first and a second threshold value according to the operated signal, a comparing signal coupling to the extracting module and comparing the operated signal with the first and second threshold values to generate a first and a second processing signal, and a latch module latching the first and second processing signals to generate an output signal.

18 Claims, 6 Drawing Sheets

BASELINE WANDERING CORRECTION DEVICE AND RELATED METHOD

BACKGROUND OF THE INVENTION

1. Field of the Invention

The invention relates to baseline wandering correction devices and methods.

2. Description of the Related Art

In wireless communication systems, the baseline wandering problem for receivers results in the receiving of wrong signals and inoperativeness of the wireless communication system. As such, correcting the baseline wandering problem has always been an important topic for the wireless communication system industry.

For Bluetooth communication systems, signals are modulated by a Gaussian Frequency Shifting Keying module (GFSK module). Comprised of RX IF filtering and demodulator inter symbol interference (demodulator ISI), a filter transient response or local oscillator frequency of the transmitter and the receiver both cause baseline wandering.

One conventional technique to solve baseline wandering is specific coding, such as Return to zero (RZ) code or Manchester code, in which the data stream does not contain a direct current component, thus reducing baseline wandering. The conventional technique, however, also reduces baseband width of the system and does not perform well when applied in Bluetooth systems.

Another conventional technique for solving baseline wandering is the Alternating Current coupling (AC coupling) method, in which signals are AC coupled to a following circuit stage. The AC coupled signals at the following circuit stage restore a DC voltage level thereof to reduce baseline wandering. The AC coupling method, however, is impracticable when there are DC components in the signals as the validity period for applying the AC coupling method is restricted.

BRIEF SUMMARY OF THE INVENTION

The invention provides correction devices and methods for baseline wandering of transmitters and receivers in wireless communication systems.

In one embodiment of the invention, a baseline wandering correction device comprises a differentiator, an operation module, an extracting module, a comparing module, and a latch module. The differentiator differentiates a data signal to generate a differentiated signal. The operation module couples to the differentiator, and proceeds with an operation based on the data signal according to the differentiated signal to generate an operated signal. The extracting module couples to the operation module, and determines a first threshold value and a second threshold value according to the operated signal. The comparing module couples to the extracting module, and compares the operated signal with the first and second threshold values to generate a first processing signal and a second processing signal, respectively. The latch module couples to the comparing module, and generates an output signal by latching the first and second processing signals.

In another embodiments of the invention, a method for correcting baseline wandering comprises of differentiating a data signal to generate a differentiated signal, generating an operated signal by proceeding with an operation based on the data signal according to the differentiated signal, determining a first threshold value and a second threshold value according to the operated signal, comparing the operated signal with the first and second threshold values to respectively generate a first processing signal and a second processing signal, and generating an output signal by latching the first and second processing signals.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
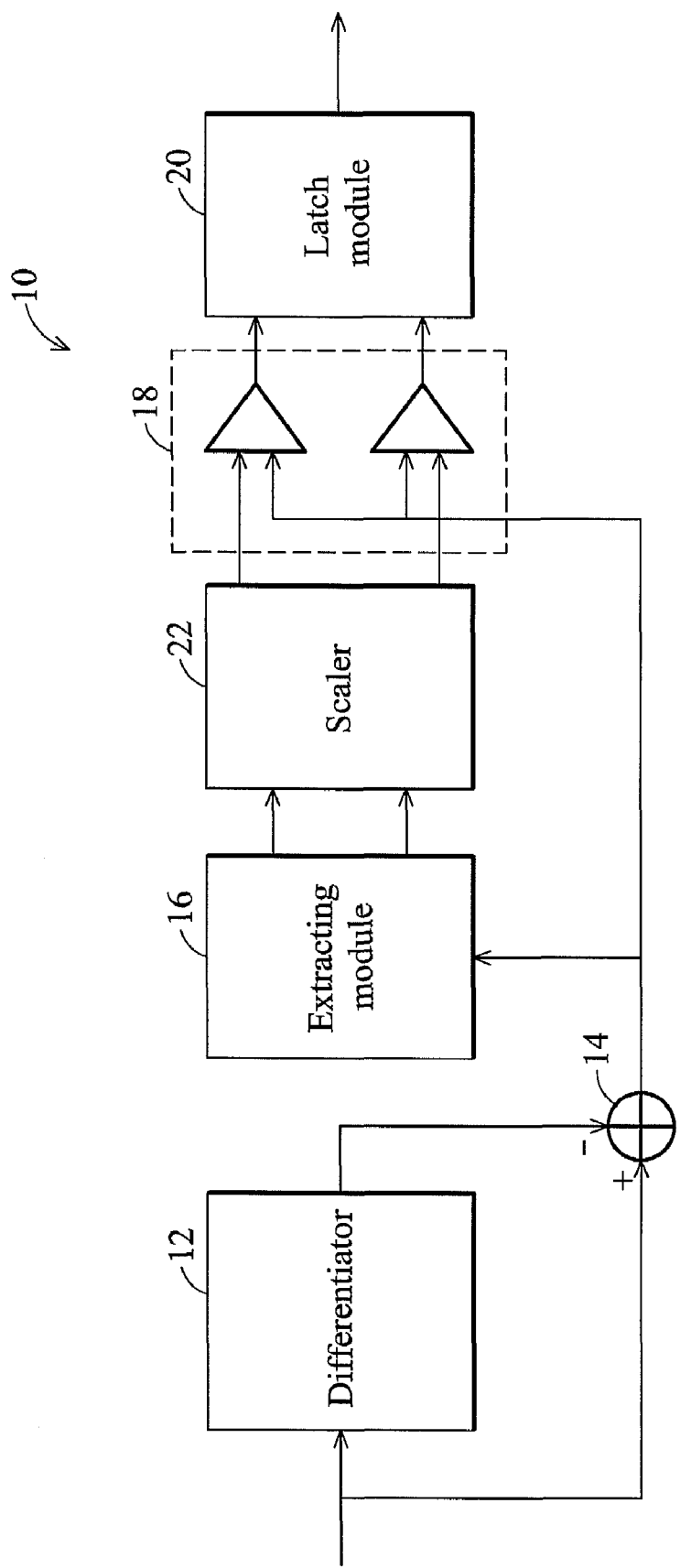
FIG. 1 shows an embodiment of the baseline wandering correction device of the invention.

FIG. 1 shows an embodiment of the baseline wandering correction device of the invention. The baseline wandering correction device 10 comprises a differentiator 12, an operation module 14, an extracting module 16, a comparing module 18, and a latch module 20. The differentiator 12 differentiates a data signal to generate a differentiated signal. The operation module 14 couples to the differentiator 12 and proceeds with an operation based on the data signal according to the differentiated signal to generate an operated signal. In some embodiments, the operation is subtraction, where the differentiated signal is subtracted from the data signal to generate the operated signal. The extracting module 16 couples to the operation module 14, and determines a first threshold value and a second threshold value according to the operated signal. The comparing module 18 couples to the extracting module 16 compares the operated signal with the first and second threshold values to generate a first processing signal and a second processing signal, respectively. The latch module 20 generates an output signal by latching the first and second processing signals.

In some embodiments, the baseline wandering correction device 10 further comprises a scalar 22, coupled between the extracting module 16 and the comparing module 18 to adjust the first and second threshold values generated by the extracting module 16.

Figure 2:
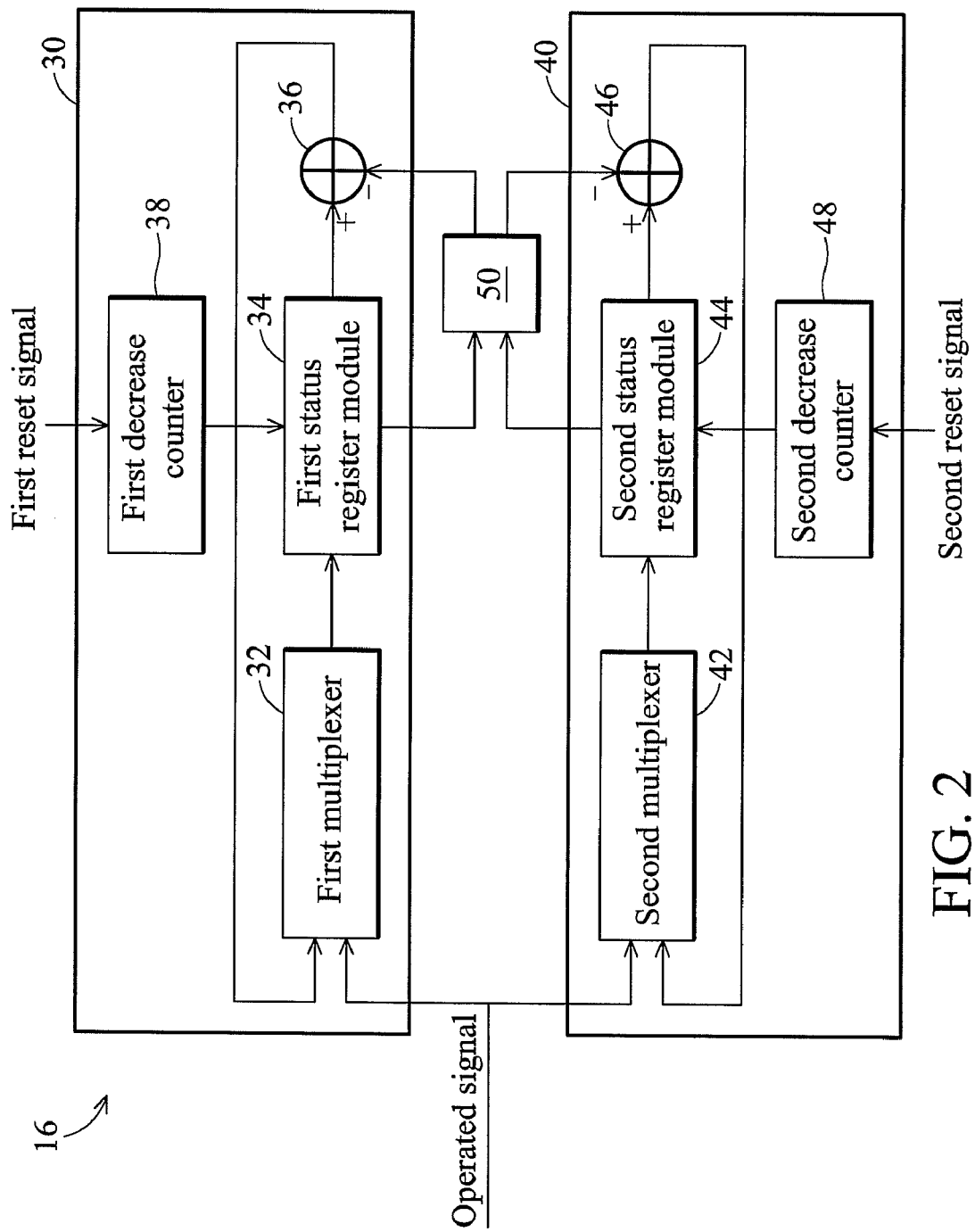
FIG. 2 shows a block diagram of the extracting module of the invention.

FIG. 2 is a block diagram of one embodiment of the extracting module 16. The extracting module 16 comprises a first extracting unit 30, a second extracting unit 40, and a gain amplifier 50. The first extracting unit 30 generates a first un-amplified signal and the first threshold value according to the operated signal and a first feedback signal. The second extracting unit 40 generates a second un-amplified signal and the second threshold value according to the operated signal and a second feedback signal. The gain amplifier 50 couples to the first and second extracting units 30 and 40, and amplifies the first and second un-amplified signals to generate the first and second feedback signals.

Referring to FIG. 2, the first extracting unit 30 further comprises a first multiplexer 32, a first status register module 34, and a first operation unit 36. The first multiplexer 32 receives the operated signal and the first threshold value to generate a first multiplexing signal. The first multiplexing signal is selected from the operated signal and the first threshold value. The first status register module 34 couples to the first multiplexer 32, and generates the first un-amplified signal according to the first multiplexing signal. The first operation unit 36 couples to the first status register module 34 and the gain amplifier 50, and receives the first un-amplified signal and the first feedback signal to generate the first threshold value.

In some embodiments, the first extracting unit 30 further comprises a first decrease counter 38, coupled to the first status register 34. The decrease counter 38 generates a first counting result by counting, and generates a first clearing signal according to a first reset signal. The first clearing signal is utilized to clear the data in the first status register 34 to reproduce the first threshold value.

The second extracting unit 40 comprises a second multiplexer 42, a second status register module 44, and a second operation unit 46. The second multiplexer 42 receives the operated signal and the second threshold value to generate a second multiplexing signal. The second status register module 44 couples to the second multiplexer 42, and generates the second un-amplified signal according to the second multiplexing signal. The second multiplexing signal is selected from the operated signal and the second threshold value. The second operation unit 46 couples to the second status register module 44 and the gain amplifier 50, and receives the second un-amplified signal and the second feedback signal to generate the second threshold value.

In some embodiments, the second extracting unit 40 further comprises a second decrease counter 48 coupled to the second status register module 44. The second decrease counter 48 generates a second counting result by counting, and generates a second clearing signal according to a second reset signal. The second clearing signal is utilized to clear the data in the second status register module 44 to reproduce the second threshold value.

In some embodiments, the operated signal is compared with the first threshold value to determine whether the operated signal reaches its peak value, and is compare with the second threshold value to determine whether the operated signal reaches its trough value. The comparing module 18 compares the operated signal with the first and second threshold values. When the operated signal is greater than the first threshold value, the comparing module 18 determines that the operated signal has reached the peak value. When the operated signal is lower than the second threshold value, the comparing circuit determines that the operated signal has reached the trough value. The comparing module 18 generates the first and second processing signals according to the comparison result.

Figure 3:
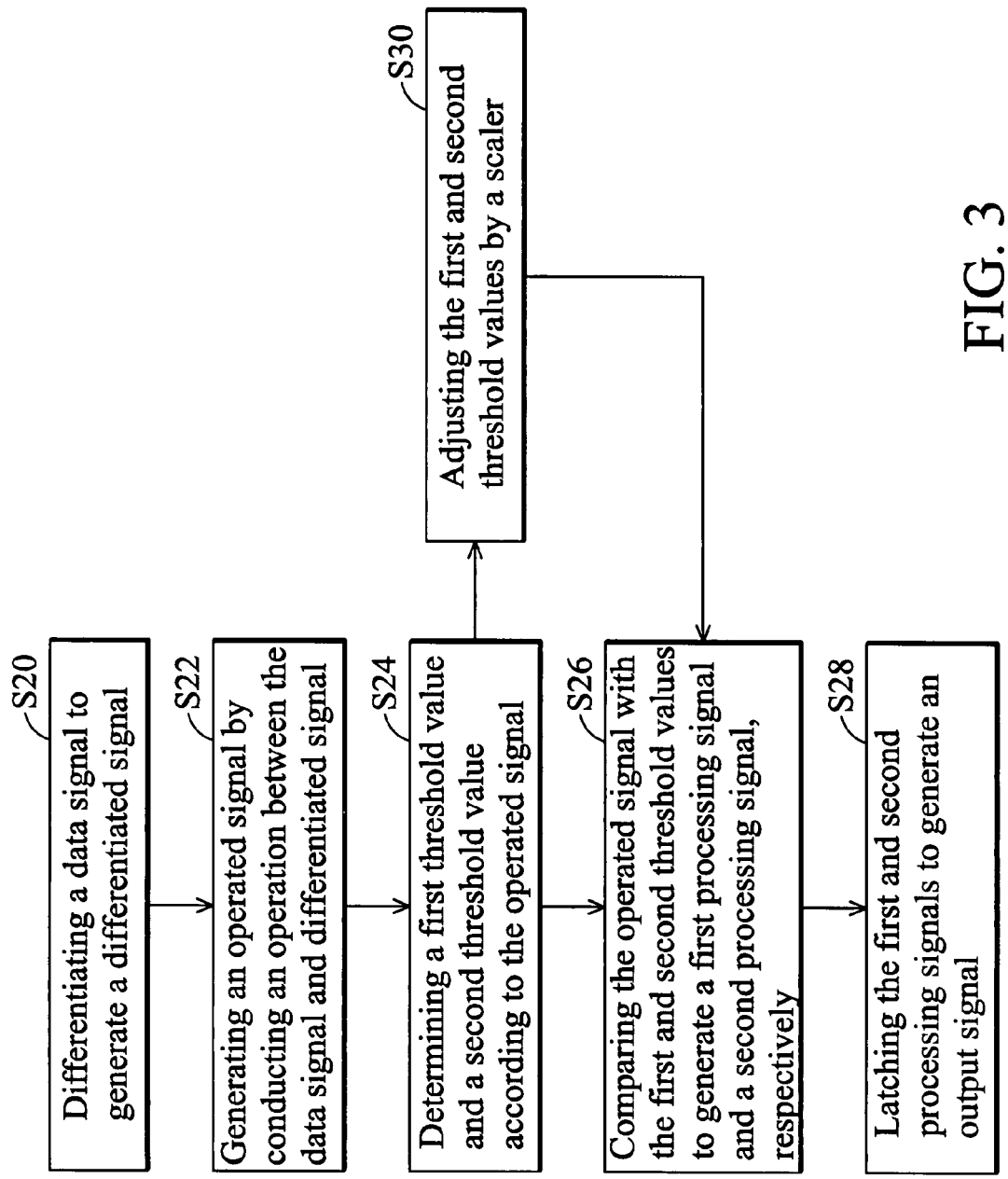
FIG. 3 shows a flow chart of the method disclosed by the invention.

FIG. 3 is a flow chart of the method of the invention. In this embodiment, the method of correcting the baseline wandering comprises the following steps. In step S20, a data signal is differentiated to generate a differentiated signal. In step S22, an operation between the data signal and differentiated signal is conducted to generate an operated signal. In step S24, a first threshold value and a second threshold value are determined according to the operated signal. In step S26, the operated signal is compared with the first and second threshold values to generate a first processing signal and a second processing signal, respectively. In step S28, the first and second processing signals are latched to generate an output signal.

In some embodiments, the method of correcting the baseline wandering further comprises a step S30, adjusting the first and second threshold values generated in step S24 by a scalar. The steps next move to S26, wherein the operated signal is then compared with the adjusted first and second threshold values to generate the first and second processing signals.

Figure 4:
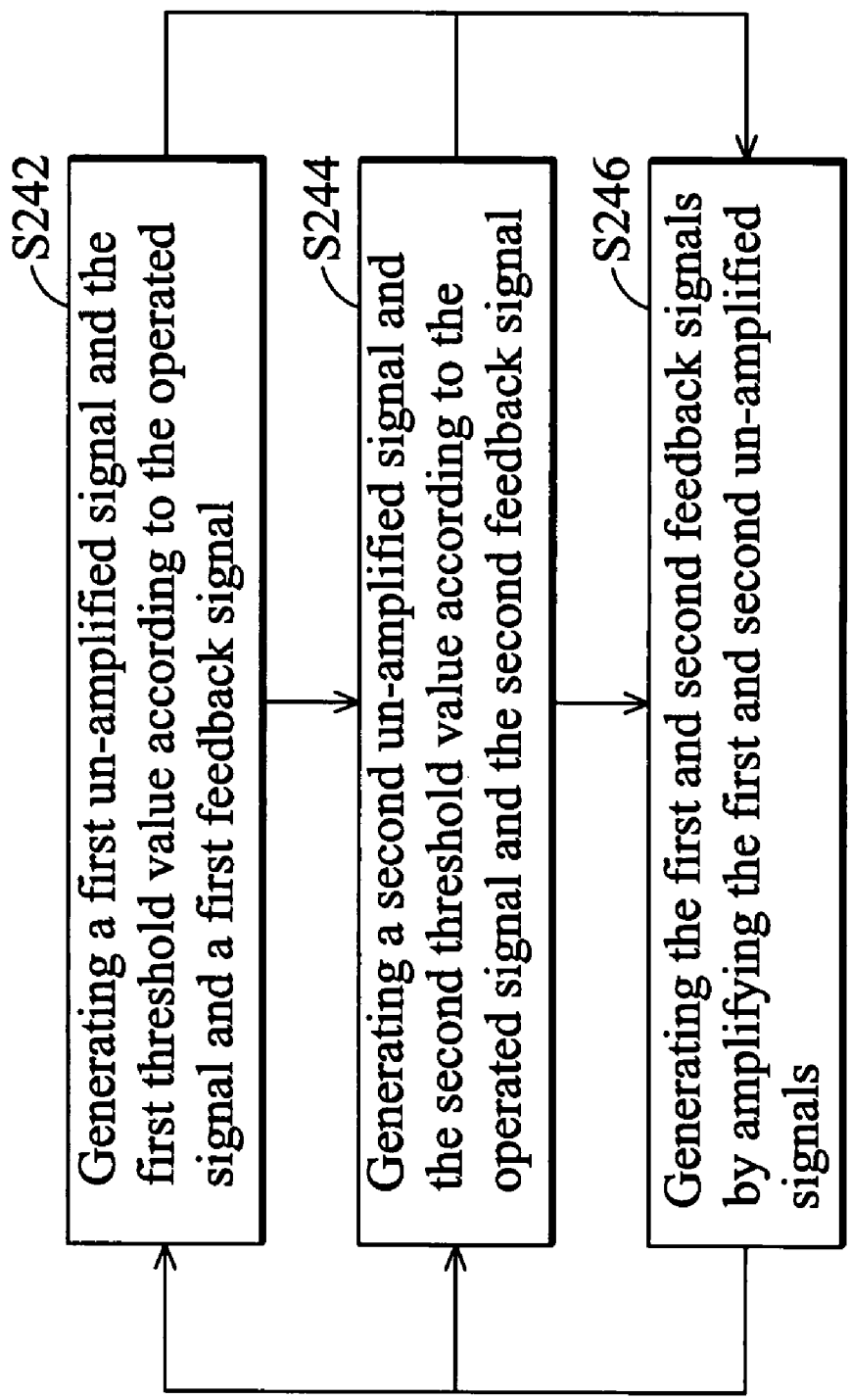
FIG. 4 shows the details of step 24 of FIG. 3.

FIG. 4 shows a flow chart of the details of step S24. In such embodiment, step 24 comprises generating a first un-amplified signal and the first threshold value according to the operated signal and a first feedback signal (step S242), generating a second un-amplified signal and the second threshold value according to the operated signal and the second feedback signal (step S244), and generating the first and second feedback signals by amplifying the first and second un-amplified signals (step S246).

Figure 5:
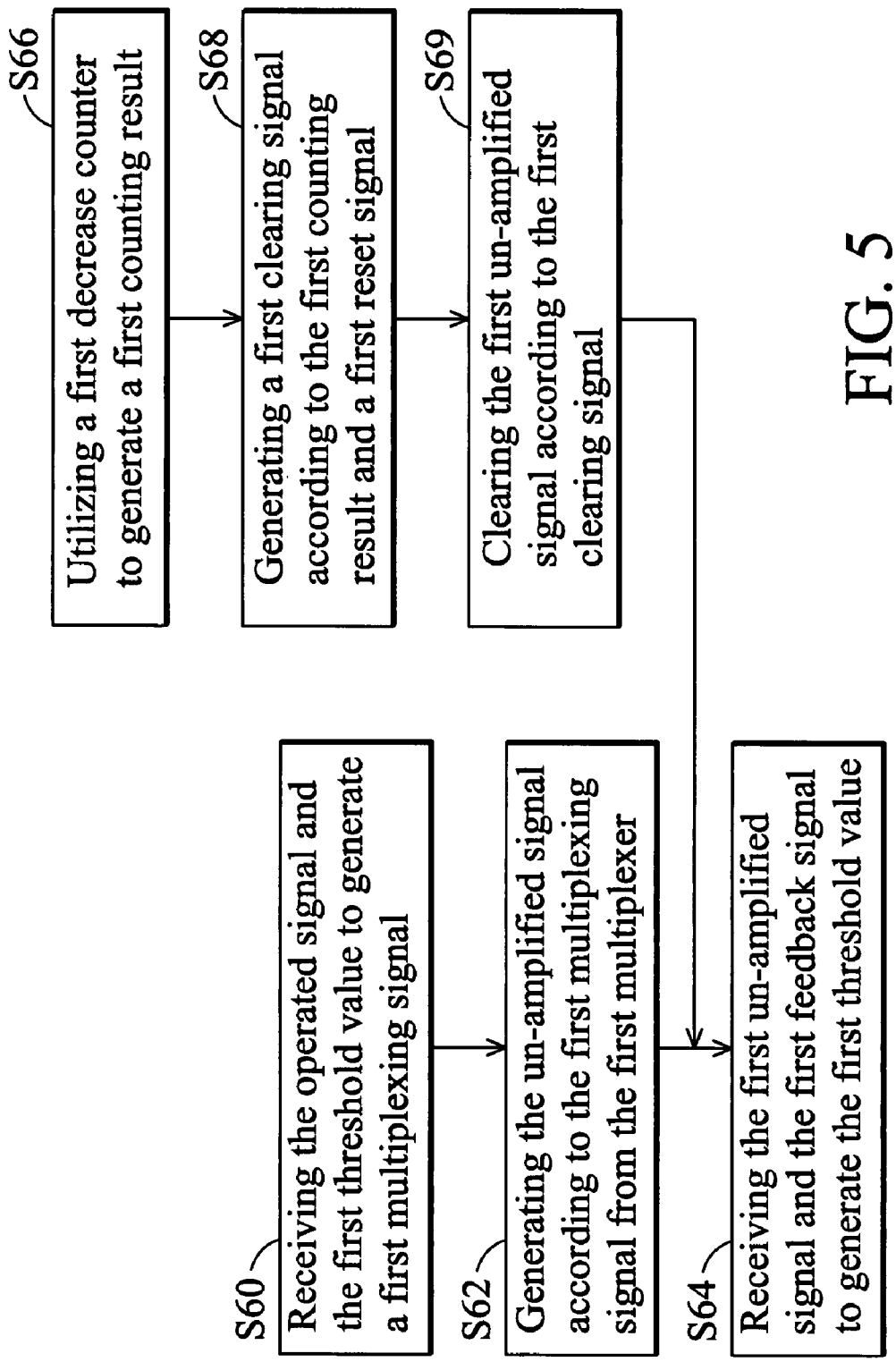
FIG. 5 shows the details of step 242 of FIG. 4.

FIG. 5 shows a flow chart of the details of step S242. In such embodiment, step S242 comprises receiving the operated signal and the first threshold value to generate a first multiplexing signal (step S60), generating the un-amplified signal according to the first multiplexing signal from the first multiplexer (step S62), and receiving the first un-amplified signal and the first feedback signal to generate the first threshold value (step S64).

As shown in FIG. 5, step S242 further comprises utilizing a first decrease counter to generate a first counting result (step S66), generating a first clearing signal according to the first counting result and a first reset signal (step S68), and clearing the first un-amplified signal according to the first clearing signal (step S69).

Figure 6:
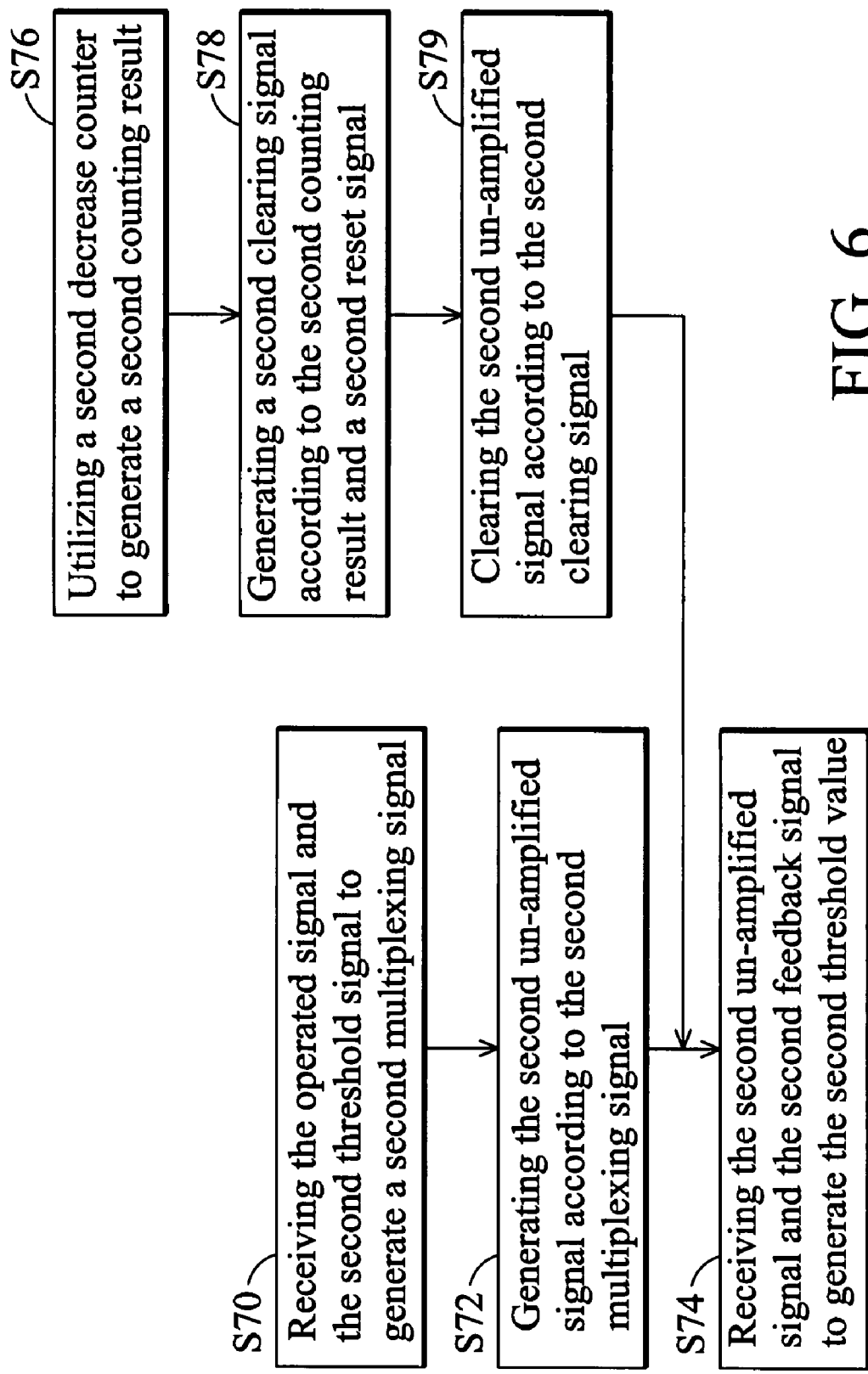
FIG. 6 shows the details of step 244 of FIG. 4.

FIG. 6 shows a flow chart of the details of step S244. In such embodiment, step S244 comprises receiving the operated signal and the second threshold signal to generate a second multiplexing signal (step S70), generating the second un-amplified signal according to the second multiplexing signal (step S72), and receiving the second un-amplified signal and the second feedback signal to generate the second threshold value (step S74).

Referring to FIG. 6, step S244 further comprises utilizing a second decrease counter to generate a second counting result (step S76), generating a second clearing signal according to the second counting result and a second reset signal (step S78), and clearing the second un-amplified signal according to the second clearing signal (step S79).

The baseline wandering correction devices and methods are applied in the receivers of the wireless communication systems to receive signals demodulated by demodulators. The received signals are differentiated, and pre-processed by pre-processing modules, such as an analog to digital converter, to generate a digital data signal. The digital data signal is processed by the operation module and the extracting module of the invention to generate the first threshold value (representing the peak value of the operated signal) and the second threshold value (representing the trough value of the operated signal). The comparing module compares the operated signal with the first and second threshold values, and the latch module latches the signals output from the comparing module. The output signal of the latch module contains no baseline wandering. The baseline wandering correction devices and methods of the invention are able to correct baseline wandering for transmitters and receivers of wireless communication systems.

While the invention has been described by way of example and in terms of embodiments, it is to be understood that the invention is not limited thereto. To the contrary, it is intended to cover various modifications and similar arrangements (as would be apparent to those skilled in the Art). Therefore, the scope of the appended claims should be accorded to the broadest interpretation so as to encompass all such modifications and similar arrangements.

What is claimed is:

1. A baseline wandering correction device for correcting baseline wandering, comprising:
   a differentiator, differentiating a data signal to generate a differentiated signal;
   an operation module, coupling to the differentiator, and proceeding with an operation based on the data signal according to the differentiated signal to generate an operated signal;
   an extracting module, coupling to the operation module, and determining a first threshold value and a second threshold value according to the operated signal;
   a comparing module, coupling to the extracting module, and comparing the operated signal with the first and second threshold values to generate a first processing signal and a second processing signal, respectively; and
   a latch module, coupling to the comparing module, and latching the first and second processing signals to generate an output signal.

2. The baseline wandering correction device as claimed in claim 1, wherein the extracting module comprises:
   a first extracting unit, generating a first un-amplified signal and the first threshold value according to the operated signal and a first feedback signal;
   a second extracting unit, generating a second un-amplified signal and the second threshold value according to the operated signal and a second feedback signal; and
   a gain amplifier, coupling to the first and second extracting units, and generating the first and second feedback signals by amplifying the first and second un-amplified signals.

3. The baseline wandering correction device as claimed in claim 2, wherein the first extracting unit comprises:
   a first multiplexer, receiving the operated signal and the first threshold value to generate a first multiplexing signal;
   a first status register module, coupling to the first multiplexer, and generating the first un-amplified signal according to the first multiplexing signal; and
   a first operation unit, coupling to the first status register module and the gain amplifier, and receiving the first un-amplified signal and the first feedback signal to generate the first threshold value;
   wherein the first multiplexing signal is selected from the operated signal and the first threshold value.

4. The baseline wandering correction device as claimed in claim 3, wherein the first extracting unit further comprises a first decrease counter, coupling to the first status register module, generating a first counting result by counting, and generating a first clearing signal according to a first reset signal.

5. The baseline wandering correction device as claimed in claim 4, wherein the first clearing signal clears the data of the first status register module.

6. The baseline wandering correction device as claimed 2, wherein the second extracting unit comprises:
   a second multiplexer, receiving the operated signal and the second threshold value to generate a second multiplexing signal;
   a second status register module, coupling to the second multiplexer, and generating the second un-amplified signal according to the second multiplexing signal; and
   a second operation unit, coupling to the second status register module and the gain amplifier, and generating the second threshold value according to the second un-amplified signal and the second feedback signal;
   wherein the second multiplexing signal is selected from the operated signal and the second threshold value.

7. The baseline wandering correction device as claimed in claim 6, wherein the second extracting unit further comprises a second decrease counter, coupling to the second status register module, generating a second counting result by counting, and generating a second clearing signal according to a second reset signal.

8. The baseline wandering correction device as claimed in claim 7, wherein the second clearing signal clears the data of the second status register module.

9. The baseline wandering correction device as claimed in claim 1 further comprising a scalar, coup led between the correction module and the comparing module to adjust the fist and second threshold values.

10. The baseline wandering correction device as claimed in claim 1, wherein the operation module operates a subtract operation on the data signal, and the differentiated signal is subtracted from the data signal to generate the operated signal.

11. A method of correcting baseline wandering, comprising:
    differentiating a data signal to generate a differentiated signal;
    proceeding with an operation based on the data signal according to the differentiated signal to generate an operated signal;
    determining a first threshold value and a second threshold value according to the operated signal;
    comparing the operated signal with the first and second threshold values to generate a first processing signal and a second processing signal, respectively; and
    latching the first and second processing signals to generate an output signal.

12. The method as claimed in claim 11, wherein the step of determining the first and second threshold values further comprises:
    generating a first un-amplified signal and the first threshold value according to the operated signal and a first feedback signal;
    generating a second un-amplified signal and the second threshold value according to the operated signal and a second feedback signal; and
    amplifying the first and second un-amplified signals to generate the first and second feedback signals.

13. The method as claimed in claim 12, wherein the step of generating the first un-amplified signal and the first threshold value further comprises:
    receiving the operated signal and the first threshold value to generate a first multiplexing signal;
    generating the first un-amplified signal according to the first multiplexing signal; and
    receiving the first un-amplified signal and the first feedback signal to generate the first threshold value;
    wherein the first multiplexing signal is selected from the operated signal and the first threshold value.

14. The method as claimed in claim 12, wherein the step of generating the first un-amplified signal and the first threshold value further comprises:
    utilizing a first decrease counter to count and to generate a first counting result;
    generating a first clearing signal according to the first counting result and a first reset signal; and
    clearing the first un-amplified signal according to the first clearing signal.

15. The method as claimed in claim 12, wherein the step of generating the second un-amplified signal and the second threshold signal further comprises:
 receiving the operated signal and the second threshold signal to generate a second multiplexing signal;
 generating the second un-amplified signal according to the second multiplexing signal; and
 receiving the second un-amplified signal and the second feedback signal to generate the second threshold value;
 wherein the second multiplexing signal is selected from the operated signal and the second threshold signal.

16. The method as claimed in claim 12, wherein the step of generating the second un-amplified signal and the second threshold signal further comprises:
 utilizing a second decrease counter to count and to generate a second counting result;
 generating a second clearing signal according to the second counting result and a second reset signal; and
 clearing the second un-amplified signal according to the second clearing signal.

17. The method as claimed in claim 11 further comprising adjusting the first and second threshold values by a scalar.

18. The method as claimed in claim 11, wherein the step proceeding the data signal is implemented by operating a subtracting operation on the data signal, and the differentiated signal is subtracted from the data signal to generate the operated signal.

* * * * *